(12) United States Patent
Munro et al.

(10) Patent No.: US 7,980,727 B2
(45) Date of Patent: Jul. 19, 2011

(54) MONOLITHIC TIRING CONDENSING ARRAYS AND METHODS THEREOF

(75) Inventors: James F. Munro, Walworth, NY (US); Penny J. Munro, Walworth, NY (US)

(73) Assignees: Reflexite Corporation, Avon, CT (US); Penny Munro, Walworth, NY (US)

( * ) Notice: Subject to any disclaimer, the term of this patent is extended or adjusted under 35 U.S.C. 154(b) by 178 days.

(21) Appl. No.: 12/287,192

(22) Filed: Oct. 7, 2008

(65) Prior Publication Data
US 2010/0085747 A1    Apr. 8, 2010

(51) Int. Cl.
*F21V 9/00* (2006.01)
(52) U.S. Cl. ........ 362/231; 362/326; 362/244; 362/237; 362/296.01
(58) Field of Classification Search .................. 362/555, 362/235, 241, 249.02, 296.05, 327, 347, 362/102, 231, 332, 245, 244, 296.01, 237, 362/326; 359/853
See application file for complete search history.

(56) References Cited

U.S. PATENT DOCUMENTS

| | | | |
|---|---|---|---|
| 5,577,492 A | 11/1996 | Parkyn et al. | |
| 6,219,480 B1* | 4/2001 | Cassarly et al. | 385/46 |
| 6,328,456 B1 | 12/2001 | Mize | |
| 6,582,103 B1 | 6/2003 | Popovich et al. | |
| 6,644,841 B2 | 11/2003 | Martineau | |
| 6,679,621 B2 | 1/2004 | West et al. | |
| 6,788,470 B2 | 9/2004 | Chen et al. | |
| 6,819,505 B1 | 11/2004 | Cassarly et al. | |
| 6,974,234 B2 | 12/2005 | Galli | |
| 7,006,306 B2 | 2/2006 | Falicoff et al. | |
| 7,021,797 B2 | 4/2006 | Minano et al. | |
| 7,083,313 B2 | 8/2006 | Smith | |
| 7,144,121 B2* | 12/2006 | Minano et al. | 353/94 |
| 7,172,319 B2 | 2/2007 | Holder et al. | |
| 7,181,378 B2 | 2/2007 | Benitez et al. | |
| 7,329,029 B2* | 2/2008 | Chaves et al. | 362/329 |
| 7,347,599 B2* | 3/2008 | Minano et al. | 362/511 |
| 7,695,177 B2* | 4/2010 | Godo | 362/555 |
| 2002/0135298 A1* | 9/2002 | Pelka et al. | 313/512 |
| 2003/0076034 A1 | 4/2003 | Marshall et al. | |
| 2005/0073756 A1 | 4/2005 | Poulsen | |
| 2005/0081909 A1* | 4/2005 | Paull | 136/246 |
| 2005/0117125 A1* | 6/2005 | Minano et al. | 353/81 |
| 2006/0061870 A1* | 3/2006 | Wang | 359/627 |
| 2006/0245173 A1 | 11/2006 | Lockamy et al. | |
| 2007/0263383 A1* | 11/2007 | Ansems et al. | 362/231 |

FOREIGN PATENT DOCUMENTS

WO    2007081719 A2    7/2007

\* cited by examiner

*Primary Examiner* — Evan Dzierzynski
(74) *Attorney, Agent, or Firm* — LeClairRyan

(57) ABSTRACT

A TIRing condensing array includes a plurality of condensing elements with at least one of the condensing elements having a first section and a second section. The first section provides substantially total internal reflection of light entering at a base of the first section. The second section tapers from the first section towards an optical axis extending through the first and second sections. The first and second sections are configured so a half-power angle of the light output from the second section is less than the half-power angle of the light entering the first section. At least one of the condensing elements is optically and mechanically connected to at least one other of the condensing elements at an attachment area between the condensing elements.

38 Claims, 10 Drawing Sheets

| | |
|---|---|
| DELTA-RHO | 0.02mm |
| INDEX | 1.46 |
| THETA-CRIT | 0.754509689rads |
| THETA-CRIT | 43.23022079degs |

| RHO (mm) | HEIGHT (mm) | THETA-O (DEGS) | NEXT SLOPE (DEGS) |
|---|---|---|---|
| 1.000 | 0.000 | 0.000 | 42.77 |
| 1.020 | 0.018501 | 1.039109 | 43.81 |
| 1.040 | 0.037686 | 2.075266 | 44.85 |
| 1.060 | 0.057578 | 3.109187 | 45.88 |
| 1.080 | 0.078201 | 4.141478 | 46.91 |
| 1.100 | 0.099582 | 5.172841 | 47.94 |
| 1.120 | 0.121750 | 6.203983 | 48.97 |
| 1.140 | 0.144736 | 7.235631 | 50.01 |
| 1.160 | 0.168575 | 8.268549 | 51.04 |
| 1.180 | 0.193307 | 9.303537 | 52.07 |
| 1.200 | 0.218974 | 10.341440 | 53.11 |
| 1.220 | 0.245622 | 11.383160 | 54.15 |
| 1.240 | 0.273305 | 12.429663 | 55.20 |
| 1.260 | 0.302080 | 13.481990 | 56.25 |
| 1.280 | 0.332015 | 14.541277 | 57.31 |
| 1.300 | 0.363181 | 15.608766 | 58.38 |
| 1.320 | 0.395663 | 16.685832 | 59.46 |
| 1.340 | 0.429556 | 17.774005 | 60.54 |
| 1.360 | 0.464969 | 18.875007 | 61.64 |
| 1.380 | 0.502028 | 19.990794 | 62.76 |
| 1.400 | 0.540878 | 21.123606 | 63.89 |
| 1.420 | 0.581691 | 22.276045 | 65.05 |
| 1.440 | 0.624671 | 23.451161 | 66.22 |
| 1.460 | 0.670062 | 24.652589 | 67.42 |
| 1.480 | 0.718162 | 25.884719 | 68.65 |
| 1.500 | 0.769339 | 27.152952 | 69.92 |
| 1.520 | 0.824059 | 28.464065 | 71.23 |
| 1.540 | 0.882922 | 29.826775 | 72.60 |
| 1.560 | 0.946729 | 31.252622 | 74.02 |
| 1.580 | 1.016580 | 32.757441 | 75.53 |
| 1.600 | 1.094066 | 34.363988 | 77.13 |
| 1.620 | 1.181628 | 36.107013 | 78.88 |
| 1.640 | 1.283351 | 38.044281 | 80.81 |
| 1.660 | 1.407027 | 40.284828 | 83.05 |
| 1.680 | 1.571207 | 43.083468 | 85.85 |
| 1.700 | 1.847065 | 47.374182 | 90.14 |
| 1.699 | 2.000000 | 49.646993 | 92.42 |
| 1.693 | 2.200000 | 52.422501 | 95.19 |
| 1.675 | 2.400000 | 55.093341 | 97.86 |
| 1.647 | 2.600000 | 57.646421 | 100.42 |
| 0.000 | 11.559838 | | |

*FIG. 4*

| θe | SOLID ANGLE SUBTENDED BY 2θe | SOLID ANGLE BEYOND θe | % OF HEMISPHERE BEYOND θe | SOURCE EMISSION BEYOND θe | APPROX % OF LIGHT EMITTED BEYOND θe |
|---|---|---|---|---|---|
| 0 | 0.0000 | 6.2832 | 100.00% | 100.00% | 100.00% |
| 2 | 0.0038 | 6.2794 | 99.94% | 96.51% | 96.45% |
| 4 | 0.0153 | 6.2679 | 99.76% | 93.02% | 92.80% |
| 6 | 0.0344 | 6.2488 | 99.45% | 89.55% | 89.06% |
| 8 | 0.0611 | 6.2220 | 99.03% | 86.08% | 85.24% |
| 10 | 0.0955 | 6.1877 | 98.48% | 82.64% | 81.38% |
| 12 | 0.1373 | 6.1459 | 97.81% | 79.21% | 77.48% |
| 14 | 0.1866 | 6.0965 | 97.03% | 75.81% | 73.56% |
| 16 | 0.2434 | 6.0398 | 96.13% | 72.44% | 69.63% |
| 18 | 0.3075 | 5.9757 | 95.11% | 69.10% | 65.72% |
| 20 | 0.3789 | 5.9043 | 93.97% | 65.80% | 61.83% |
| 22 | 0.4575 | 5.8257 | 92.72% | 62.54% | 57.99% |
| 24 | 0.5432 | 5.7400 | 91.35% | 59.33% | 54.20% |
| 26 | 0.6359 | 5.6473 | 89.88% | 56.16% | 50.48% |
| 28 | 0.7355 | 5.5477 | 88.29% | 53.05% | 46.84% |
| 30 | 0.8418 | 5.4414 | 86.60% | 50.00% | 43.30% |
| 32 | 0.9547 | 5.3284 | 84.80% | 47.01% | 39.87% |
| 34 | 1.0742 | 5.2090 | 82.90% | 44.08% | 36.54% |
| 36 | 1.2000 | 5.0832 | 80.90% | 41.22% | 33.35% |
| 38 | 1.3320 | 4.9512 | 78.80% | 38.43% | 30.29% |
| 40 | 1.4700 | 4.8132 | 76.60% | 35.72% | 27.36% |
| 42 | 1.6139 | 4.6693 | 74.31% | 33.09% | 24.59% |
| 44 | 1.7634 | 4.5197 | 71.93% | 30.53% | 21.96% |
| 46 | 0.9185 | 4.3647 | 69.47% | 28.07% | 19.50% |
| 48 | 2.0789 | 4.2043 | 66.91% | 25.69% | 17.19% |
| 50 | 2.2444 | 4.0388 | 64.28% | 23.40% | 15.04% |
| 52 | 2.4149 | 3.8683 | 61.57% | 21.20% | 13.05% |
| 54 | 2.5900 | 3.6932 | 58.78% | 19.10% | 11.23% |
| 56 | 2.7697 | 3.5135 | 55.82% | 17.10% | 9.56% |
| 58 | 2.9536 | 3.3296 | 52.99% | 15.20% | 8.05% |
| 60 | 3.1416 | 3.1416 | 50.00% | 13.40% | 6.70% |
| 62 | 3.3334 | 2.9498 | 46.95% | 11.71% | 5.50% |
| 64 | 3.5288 | 2.7544 | 43.84% | 10.12% | 4.44% |
| 66 | 3.7276 | 2.5556 | 40.67% | 8.65% | 3.52% |
| 68 | 3.9295 | 2.3537 | 37.46% | 7.28% | 2.73% |
| 70 | 4.1342 | 2.1490 | 34.20% | 6.03% | 2.06% |
| 72 | 4.3416 | 1.9416 | 30.90% | 4.89% | 1.51% |
| 74 | 4.5513 | 1.7319 | 27.56% | 3.87% | 1.07% |
| 76 | 4.7631 | 1.5200 | 24.19% | 2.97% | 0.72% |
| 78 | 4.9768 | 1.3063 | 20.79% | 2.19% | 0.45% |
| 80 | 5.1921 | 1.0911 | 17.36% | 1.52% | 0.26% |
| 82 | 5.4087 | 0.8745 | 13.92% | 0.97% | 0.14% |
| 84 | 5.6264 | 0.6568 | 10.45% | 0.55% | 0.06% |
| 86 | 5.8449 | 0.4383 | 6.98% | 0.24% | 0.02% |
| 88 | 6.0639 | 0.2193 | 3.49% | 0.06% | 0.00% |
| 90 | 6.2832 | 0.0000 | 0.00% | 0.00% | 0.00% |

*FIG. 10*

MONOLITHIC TIRING CONDENSING ARRAYS AND METHODS THEREOF

FIELD OF THE INVENTION

This invention generally relates to condensing elements and, more particularly, to monolithic, totally internally reflecting (TIRing) condensing arrays and methods thereof.

BACKGROUND

Typically, a light emitting diode (LED) emits light into a full hemisphere. For some applications, such as for display lighting or general room lighting, such an output can be desirable. However, for other applications, such as for a flashlight or a vehicular headlight, a more focused output is required.

To provide this narrower viewing angle, the light output from the LED often is condensed. A variety of devices have been developed to condense light from an LED, such as devices that utilize a compound parabolic reflector. Unfortunately, these prior devices have a number of drawbacks including being expensive to produce, physically large, inefficient, and difficult to implement in an array configuration.

Other applications not only require a condensed light output from a single LED, but from a plurality of LEDs. Accordingly, to generate these multiple condensed light outputs, multiple optical elements for condensing light are often interconnected. Unfortunately, these prior designs for interconnecting multiple optical elements typically sacrifice some performance in condensing light in exchange for manufacturability.

SUMMARY

A condensing array in accordance with embodiments of the present invention includes a plurality of condensing elements with at least one of the condensing elements having a first section and a second section. The first section provides substantially total internal reflection of light entering at a base of the first section. The second section tapers from the first section towards an optical axis extending through the first and second sections. The first and second sections are configured so a half-power angle of the light output from the second section is less than the half-power angle of the light entering the first section. At least one of the condensing elements is optically and mechanically connected to at least one other of the condensing elements at an attachment area between the condensing elements.

A method for making a condensing array in accordance with other embodiments of the present invention includes forming a plurality of condensing elements with at least one of the condensing elements having a first section and a second section. The first section provides substantially total internal reflection of light entering at a base of the first section. The second section tapers from the first section towards an optical axis extending through the first and second sections. The first and second sections are configured so a half-power angle of the light output from the second section is less than the half-power angle of the light entering the first section. At least one of the condensing elements is optically and mechanically coupled to at least one other of the condensing elements at an attachment area between the condensing elements.

Accordingly, the present invention provides a condensing array with a plurality of condensing elements which are optically and mechanically attached to one another in a manner that does not significantly compromise condensing performance. Additionally, the present invention provides a condensing array that is easy and inexpensive to manufacture and which has a compact design.

BRIEF DESCRIPTION OF THE DRAWINGS

FIG. 4 is a spreadsheet of examples of coordinates for the profiles of the condensing elements in the TIRing condensing array;

FIG. 10 is an exemplary table of emissions.

DETAILED DESCRIPTION

Figure 1:
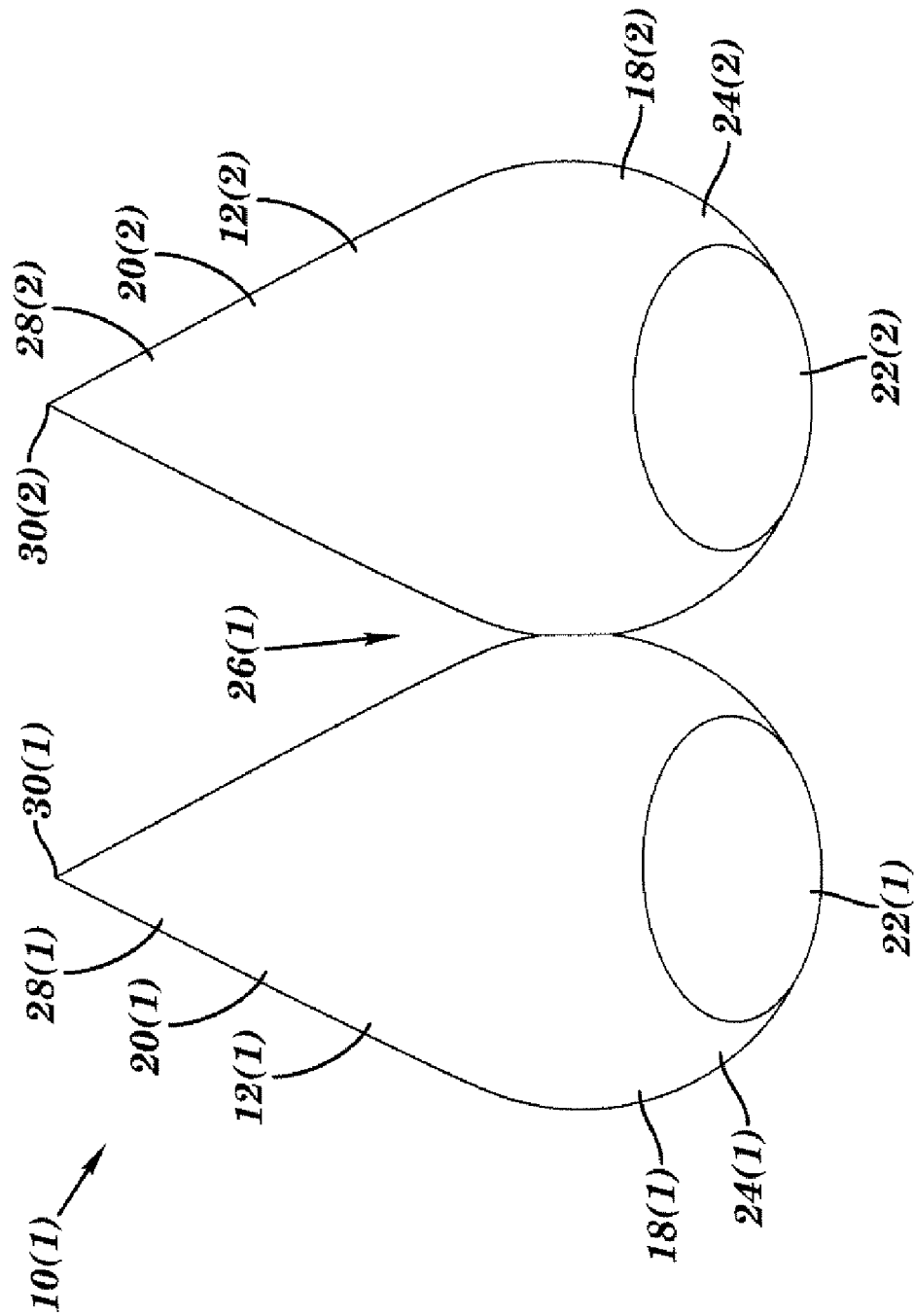
FIG. 1 is a perspective view of a TIRing condensing array in accordance with embodiments of the present invention.
Figure 2:
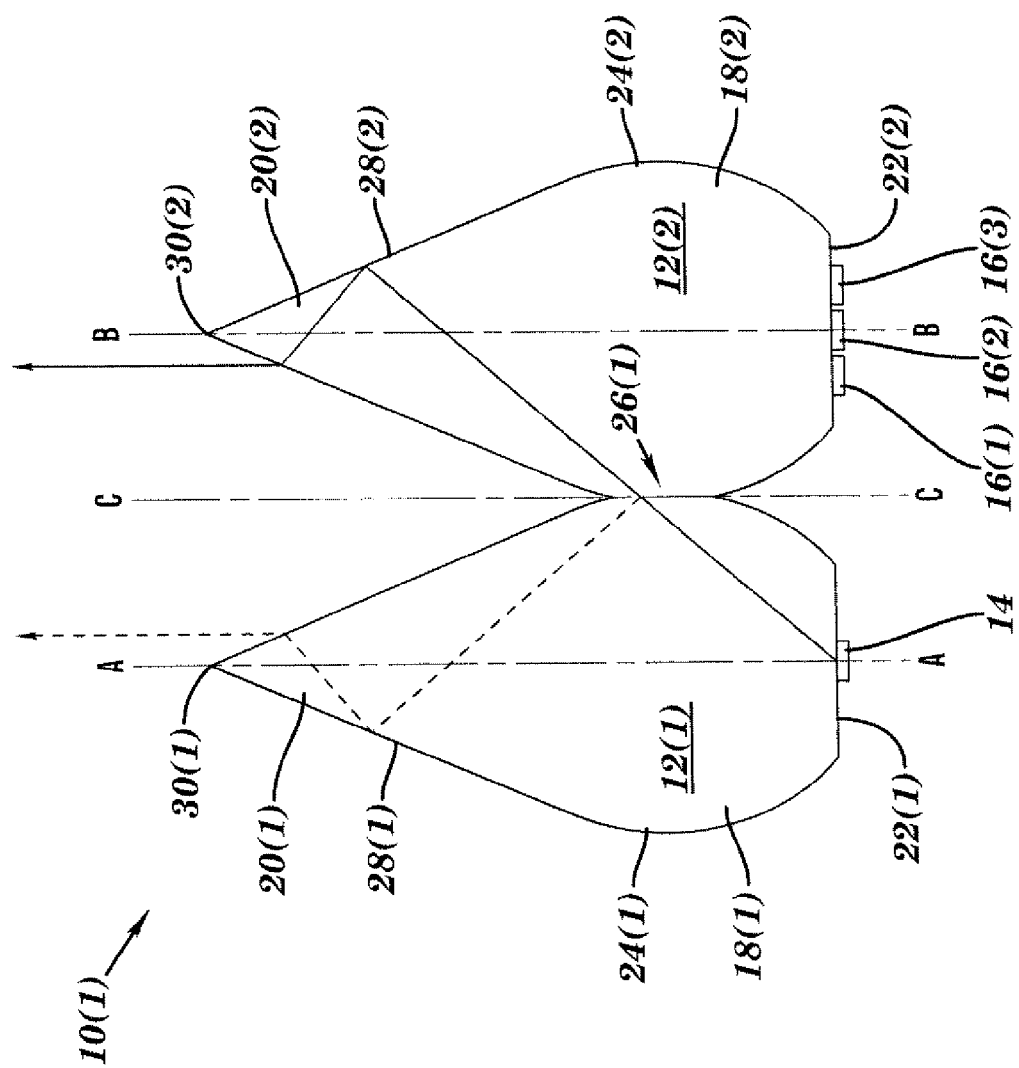
FIG. 2 is a side, cross-sectional view of the TIRing condensing array shown in FIG. 1.

A TIRing condensing array 10(1) in accordance with embodiments of the present invention is illustrated in FIGS. 1 and 2. The TIRing condensing array 10(1) includes condensing elements 12(1)-12(2), although the TIRing condensing array can include other types and numbers of components, devices, and/or systems configured in other manners and other types of condensing arrays can be used, such as condensing arrays 10(2), 10(3), and 10(4) illustrated in FIGS. 5, 6, and 7 respectively and by way of example only. Accordingly, the present invention provides a condensing array with a plurality of condensing elements which are optically and mechanically attached to one another without significantly compromising condensing performance.

Referring more specifically to FIGS. 1 and 2, the condensing array 10(1) is formed as a monolithic structure, although the condensing array can formed as two or more structures. The condensing array 10(1) has the two condensing elements 12(1)-12(2), although the condensing array can have other numbers and types of condensing elements in other configurations, such as a series of side by side condensing elements or a two dimensional array of condensing elements. The condensing elements 12(1)-12(2) are each made of polymer, although each of the condensing elements could be made of other types and numbers of materials, such as glass. Additionally, the condensing elements 12(1)-12(2) have a refractive index between about 1.4 and 1.7, although each of the condensing elements could have other ranges for the refractive index.

Each of the condensing elements 12(1)-12(2) has a first section 18(1)-18(2) and a second section 20(1)-20(2), respectively, although each of the condensing elements 12(1)-12(2)

could have other types and numbers of sections in other configurations. The first and second sections 18(1) and 20(1) are integrally formed together and the first and second sections 18(2) and 20(2) also are integrally formed together, although these sections can be formed or connected together in other manners.

The first section 18(1) is optically and mechanically interconnected with the first section 18(2) at an attachment area 26(1), although each of the first sections 18(1)-18(2) may have other numbers of optical and mechanical interconnections depending on the number of condensing elements in the condensing array 10(1) and the attachment area 26(1). Although the attachment area 26(1) is shown between the first sections 18(1)-18(2), the attachment area can extend into other regions, such as into one or both of the second sections 20(1)-20(2). An optical axis A-A extends through the condensing element 12(1) and an optical axis B-B extends through the condensing element 12(2). Attachment area 26(1) extends substantially along a plane and an axis C-C substantially extends along this plane and is substantially parallel to the optical axes A-A and B-B and substantially perpendicular to bases 22(1) and 22(2), although the attachment area 26(1) can have other locations and orientations. By way of example only, one or more of the optical axes A-A and B-B could have other orientations which are not substantially perpendicular to the bases 22(1) and 22(2), however the attachment area 26(1) can still be substantially perpendicular to bases 22(1)-22(2). This particular location and orientation of the attachment area 26(1) along axis C-C which is substantially parallel with respect to the optical axes A-A and B-B is selected to enable the condensing elements 12(1)-12(2) to be optically and mechanically interconnected without significantly compromising condensing performance, although again the optically axes A-A and B-B can have other orientations without compromising condensing performance.

The first sections 18(1)-18(2) each have a rotationally symmetric configuration, although each of the first sections 18(1)-18(2) could have other types, configurations, shapes, or number of sides, such as four-sided, six-sided, eight-sided, triangular, square, and rectangular and could have an asymmetric configuration. The first sections 18(1)-18(2) each have a base 22(1)-22(2) and a sidewall 24(1)-24(2), respectively, although each of the first sections 18(1)-18(2) could have other numbers and types of top, bottom and side walls. The bases 22(1)-22(2) each have a plano configuration to facilitate the attachment of the LEDs 14 and 16(1)-16(3), although each of the bases 22(1)-22(2) could have other configurations, such as convex or concave.

The sidewalls 24(1)-24(2) are each formed to have a curvature in cross-section that provides substantially total internal reflection of light entering at the base 22(1)-22(2) of the first sections 18(1)-18(2), respectively, although the sidewalls could have other properties and configurations. In particular, the sidewall slope angle of the sidewalls 24(1)-24(2) is selected so that light from the LEDs 14 and 16(1)-16(3), respectively, will be substantially totally internal reflected at all locations on the sidewalls 24(1)-24(2).

Figure 3:
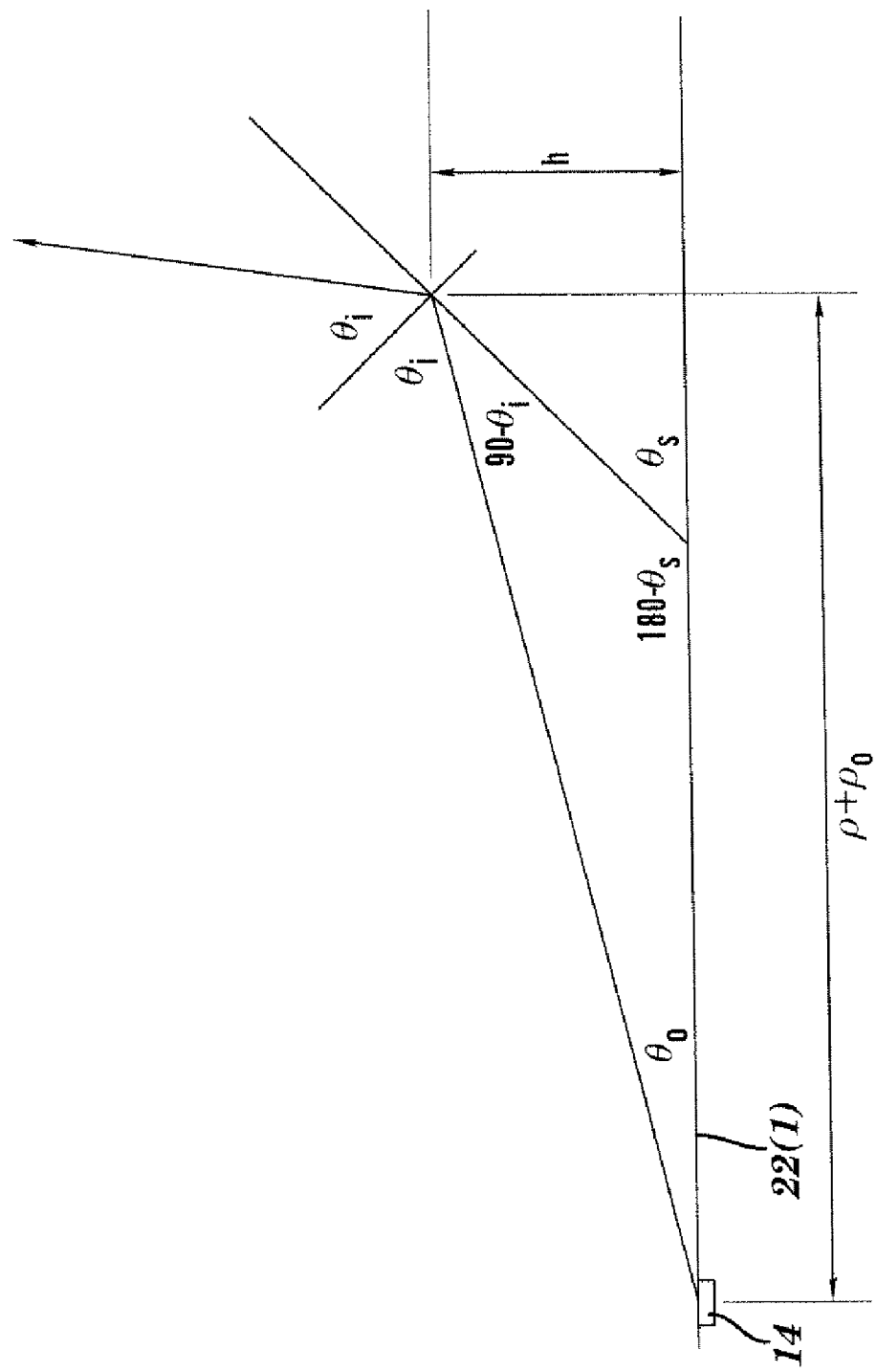
FIG. 3 is a diagram of an example of geometrical calculations for generating a TIRing section in each of the condensing elements in the TIRing condensing array.

A diagram illustrating an example of the geometrical calculations for determining the curvature of each of the sidewalls 24(1)-24(2) to generate TIR in the first sections 18(1)-18(2), respectively, is illustrated in FIG. 3. In these calculations, the variables are:

$\theta_0$: The light exit angle from the LED with respect to the base surface;

$\theta_s$: The instantaneous angle of a differential TIRing surface element with respect to the base surface;

$\theta_i$: The angle of incidence that the light makes with the differential surface element;

h: The vertical distance from the base to the point of incidence;

$\rho_0$: The lateral distance from the LED to the edge of the plano base area;

$\rho$: The lateral distance from the edge of the plano base area to the point of incidence.

Additionally, in these calculations the critical angle, $\theta_c$, is defined so that $\theta_i > \theta_c + 4°$ for TIR to occur. The +4° is a buffer angle, $\theta_B$, selected to provide a buffer for robustness, although other angular buffer amounts or no buffer could be used. By inspection, $\theta_s = 90 + \theta_0 - (\theta_c + 4)$, and from Snell's Law $\theta_c = \sin^{-1}(1/n)$, where n is the refractive index of the optical element. Also, $h = (\rho + \rho_0) \tan \theta_0$, for entry into a spreadsheet for numerical stepwise computation of values, $h_{next} = h_{prev} + (\Delta\rho) \tan \theta_{sprev}$. Assuming $\rho_0$ is 1.0 mm in this example, a spreadsheet with the coordinates of the profiles for the condensing elements 10(1) is illustrated in FIG. 4.

The second sections 20(1)-20(2) each have a rotationally symmetric configuration, although each of the second sections 20(1)-20(2) could have other types, configurations, shapes, or number of sides, such as four-sided, six-sided, eight-sided, triangular, square, and rectangular and could have an asymmetric configuration. The second sections 20(1)-20(2) also each have a sidewall 28(1)-28(2) which is formed to be substantially linear in cross-section and tapers to an endpoint 30(1)-30(2) which intersects with the optical axes A-A and B-B, respectively, although each of the second sections 20(1)-20(2) could have other numbers and types of walls in other shapes and configurations, such as concave, convex, parabolic, elliptical, or otherwise mathematically characterized by a polynomial. The sidewalls 28(1)-28(2) each provides internal reflection and refraction of the light. The first sections 18(1)-18(2) and second sections 20(1)-20(2) are configured so a half-power angle of the light output from each of the second sections 20(1)-20(2) is less than the half-power angle of the light entering each of the first sections 18(1)-18(2). In this particular embodiment, the half-power angle of the light output from each of the second sections 20(1)-20(2) is less than or equal to about twenty degrees about the optical axis and the half-power angle of the light entering each of the first sections 18(1)-18(2) is greater than or equal to forty degrees about the optical axis, although other half-power angles could be used.

To broaden the central portion of the distribution of condensed light output from the second sections 20(1)-20(2), the sidewalls 28(1)-28(2) could be non-linear in cross-section, textured, and/or made from a light diffusing material (also known as a bulk scattering or bulk diffusing or bulk diffusing material) although other manners for broadening the distribution could be used. In this particular embodiment, the sidewall 28(2) is textured and is made from a light diffusing material, although the sidewall 28(2) could have other types of surfaces, such as smooth.

The LED 14 is attached to the base 22(1) at the intersection with axis A-A and LEDs 16(1)-16(3) are attached to base 22(2) to the intersection with axis B-B, although other numbers and types of light sources at other locations and which are attached or otherwise integrally formed in can be used. The LEDs 16(1)-16(3) are spaced less than 10 mm apart on the base 22(2), although other spacing can be used, such as 0.5 mm. The LED 14 is positioned to transmit light into condensing element 12(1) and LEDs 16(1)-16(3) are positioned to transmit light into condensing element 12(2), although other arrangements with other numbers and types of light sources could be used. The LED 14 contains phosphor and is white colored and the LEDs 16(1)-16(3) are red, green, and blue colored LEDs, although again other types and numbers of light sources could be used for the condensing elements, such as organic LEDs, inorganic LEDs, LEDs in chip or die format, and LEDs which have leads and subsequently are encapsulated in the condensing elements.

Figure 5:
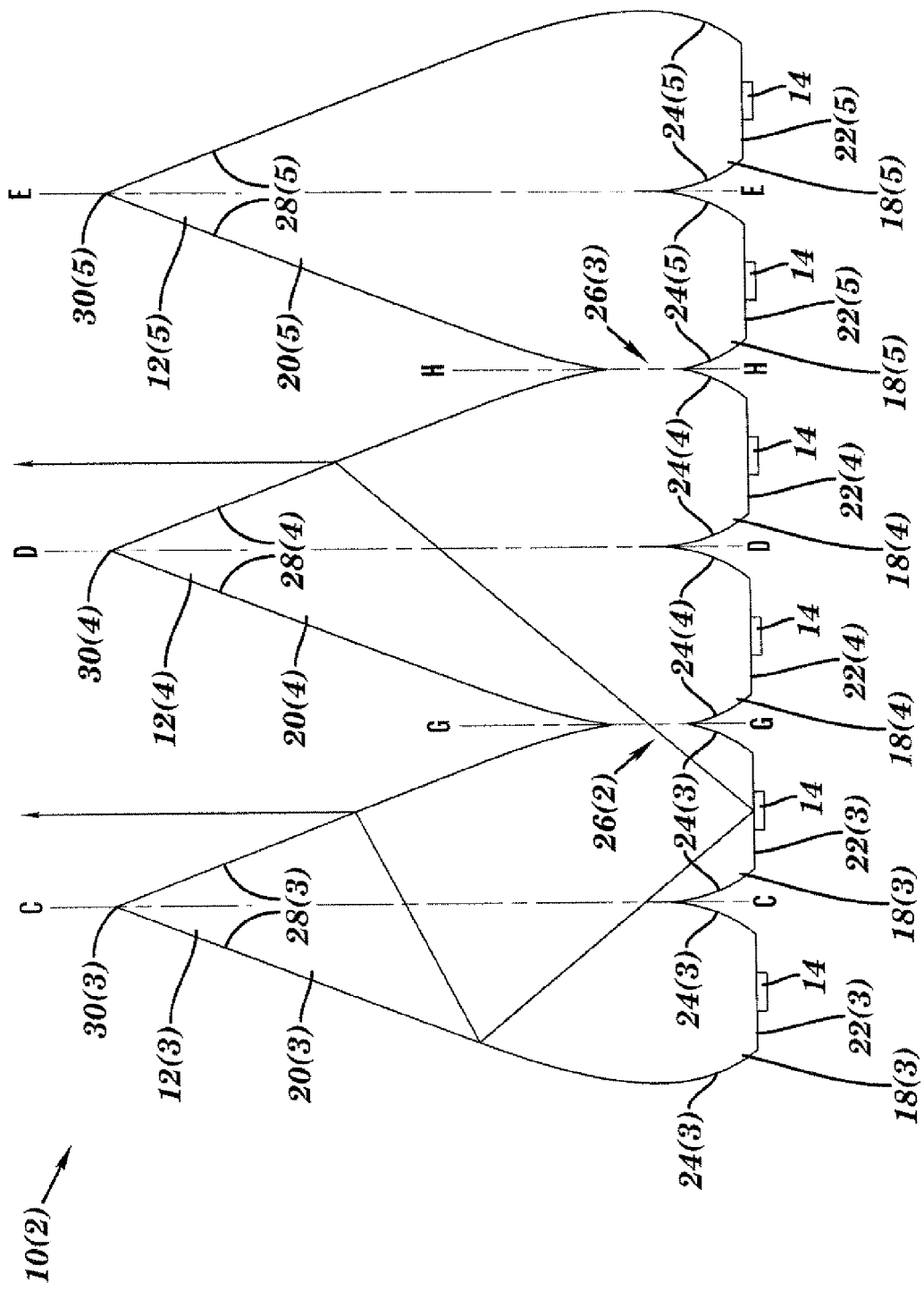
FIG. 5 is a side, cross-sectional view of another TIRing condensing array with dual-base condensing elements in accordance with other embodiments of the present invention.

Referring to FIG. 5, a condensing array 10(2) in accordance with other embodiments of the present invention is illustrated. The condensing array 10(2) is the same as condensing array 10(1), except as illustrated and described herein. Elements of condensing array 10(2) which are like elements in condensing array 10(1) will have like reference numerals.

The condensing array 10(2) is formed as a monolithic structure, although the condensing array 10(2) can formed as two or more structures. The condensing array 10(2) has the three condensing elements 12(3)-12(5), although the condensing array can have other numbers and types of condensing elements in other configurations. The condensing elements 12(3)-12(5) are each made of polymer, although each of the condensing elements could be made of other types and numbers of materials, such as glass. Additionally, the condensing elements 12(3)-12(5) have a refractive index between about 1.4 and 1.7, although each of the condensing elements could other ranges for the refractive index.

Each of the condensing elements 12(3)-12(5) has two first sections 18(3)-18(5) and a second section 20(3)-20(5), respectively, although each of the condensing elements 12(3)-12(5) could have other types and numbers of sections in other configurations. The two first sections 18(3) and second section 20(3) are integrally formed together, the two first sections 18(4) and the second section 20(4) are integrally formed together, and the two first sections 18(5) and the second section 20(5) are integrally formed together, although these sections can be formed or connected together in other manners.

One of the first sections 18(3) of the condensing element 12(3) is optically and mechanically interconnected with one of the first sections 18(4) of the condensing element 12(4) at an attachment area 26(2) and another one of the first sections 18(4) of the condensing element 12(4) is optically and mechanically interconnected with one of the first sections 18(5) of the condensing element 12(5) at an attachment area 26(3), although each of the condensing elements 12(3)-12(5) may have other numbers of optical and mechanical interconnections depending on the number of condensing elements in the condensing array 10(2) and the optical and mechanical interconnections can have other dimensions and locations. For example, these optical and mechanical interconnections can extend into one or more of the second sections 20(3), 20(4), and 20(5) in optical elements 12(3), 12(4), and 12(5). An optical axis C-C extends through the condensing element 12(3), an optical axis D-D extends through the condensing element 12(4), and an optical axis E-E extends through the condensing element 12(5), although other arrangements can be used. Attachment area 26(2) extends substantially along a plane and an axis G-G substantially extends along this plane and is substantially parallel to the optical axes C-C and D-D, although the attachment area 26(2) can have other locations and orientations. By way of example only, one or more of the optical axes C-C and D-D could have other orientations which are not substantially perpendicular to the bases 22(1) and 22(2), however the attachment area 26(2) can still be substantially perpendicular to bases 22(3)-22(4). Attachment area 26(3) extends substantially along a plane and an axis H-H substantially extends along this plane and is substantially parallel to the optical axes D-D and E-E, although the attachment area 26(3) can have other locations and orientations. By way of example only, one or more of the optical axes D-D and E-E could have other orientations which are not substantially perpendicular to the bases 22(4) and 22(5), however the attachment area 26(3) can still be substantially perpendicular to bases 22(4)-22(5). This particular location and orientation of the attachment area 26(2) along axis G-G which is substantially parallel with respect to the optical axes C-C and D-D and of the attachment area 26(3) along axis H-H which is substantially parallel with respect to the optical axes D-D and E-E is selected to enable the condensing elements 12(3)-12(5) to be optically and mechanically interconnected without significantly compromising condensing performance, although again one or more of the optically axes C-C, D-D, and E-E can have other orientations.

Each of the two first sections 18(3), two first sections 18(4) and two first sections 18(5) have a rotationally symmetric configuration, although each of the first sections 18(3)-18(5) could have other types, configurations, shapes, or number of sides, such as four-sided, six-sided, eight-sided, triangular, square, and rectangular and could have an asymmetric configuration. The two first sections 18(3) each have a base 22(3) and sidewalls 24(3), respectively, although each of the first sections 18(3) could have other numbers and types of top, bottom and sidewalls. The two first sections 18(4) each have a base 22(4) and sidewalls 24(4), respectively, although each of the first sections 18(4) could have other numbers and types of top, bottom and side walls. The two first sections 18(5) each have a base 22(5) and sidewalls 24(5), respectively, although each of the first sections 18(5) could have other numbers and types of top, bottom and side walls. The two bases 22(3) for condensing element 12(3), the two bases 22(4) for condensing element 12(4), and two bases 22(5) for condensing element 12(5), each have a plano configuration to facilitate the attachment of the LEDs 14, although each of the bases 22(1)-22(2) could have other configurations, such as convex or concave.

The sidewalls 24(3)-24(5) are each formed to have a curvature in cross-section that provides substantially total internal reflection of light entering at each of the bases 22(3)-22(5) of the first sections 18(3)-18(5), respectively, although the sidewalls could have other properties and configurations. In particular, the sidewall slope angle of the sidewalls 24(3)-24(5) is selected so that light from the LEDs 14 will be substantially totally internal reflected at all locations on the sidewalls 24(3)-24(5). An example of the geometrical calculations for determining the curvature of each of the sidewalls was provided earlier and thus will not be repeated again here.

The second sections 20(3)-20(5) each have a rotationally symmetric configuration, although each of the second sections 20(3)-20(5) could have other types, configurations, shapes, or number of sides, such as four-sided, six-sided, eight-sided, triangular, square, and rectangular and could have an asymmetric configuration. The second sections 20(3)-20(5) also each have a sidewall 28(3)-28(5), respectively which is formed to be substantially linear in cross-section and tapers to an endpoint 30(3)-30(5) which intersects with the optical axes C-C, D-D, and E-E, respectively, although each of the second sections 20(3)-20(5) could have other numbers and types of walls in other shapes and configurations, such as concave, convex, parabolic, elliptical, or otherwise mathematically characterized by a polynomial and which do not taper to an endpoint. The sidewalls 28(3)-28(5) each provides internal reflection and refraction of the light. The first sections 18(3)-18(5) and second sections 20(3)-20(5) are configured so a half-power angle of the light output from each of the second sections 20(3)-20(5) is less than the half-power angle of the light entering each of the first sections 18(3)-18(5). In this particular embodiment, the half-power angle of the light output from each of the second sections 20(3)-20(5) is less than or equal to about twenty degrees about the optical axis and the half-power angle of the light entering each of the first sections 18(3)-18(5) is greater than or equal to forty degrees about the optical axis, although other half-power angles could be used.

To broaden the central portion of the distribution of condensed light output from the second sections 20(3)-20(5), the sidewalls 28(3)-28(5) could be non-linear in cross-section, textured, and/or made from a light diffusing material (also known as a bulk scattering or bulk diffusing or bulk diffusing material) although other manners for broadening the distribution could be used.

The LEDs 14 are each attached to one of the bases 22(3)-22(5), although other numbers and types of light sources at other locations and which are attached or otherwise integrally formed in can be used. The LEDs 14 are each positioned to transmit light into the first sections 18(3)-18(5) of condensing elements 12(3)-12(5).

Figure 6:
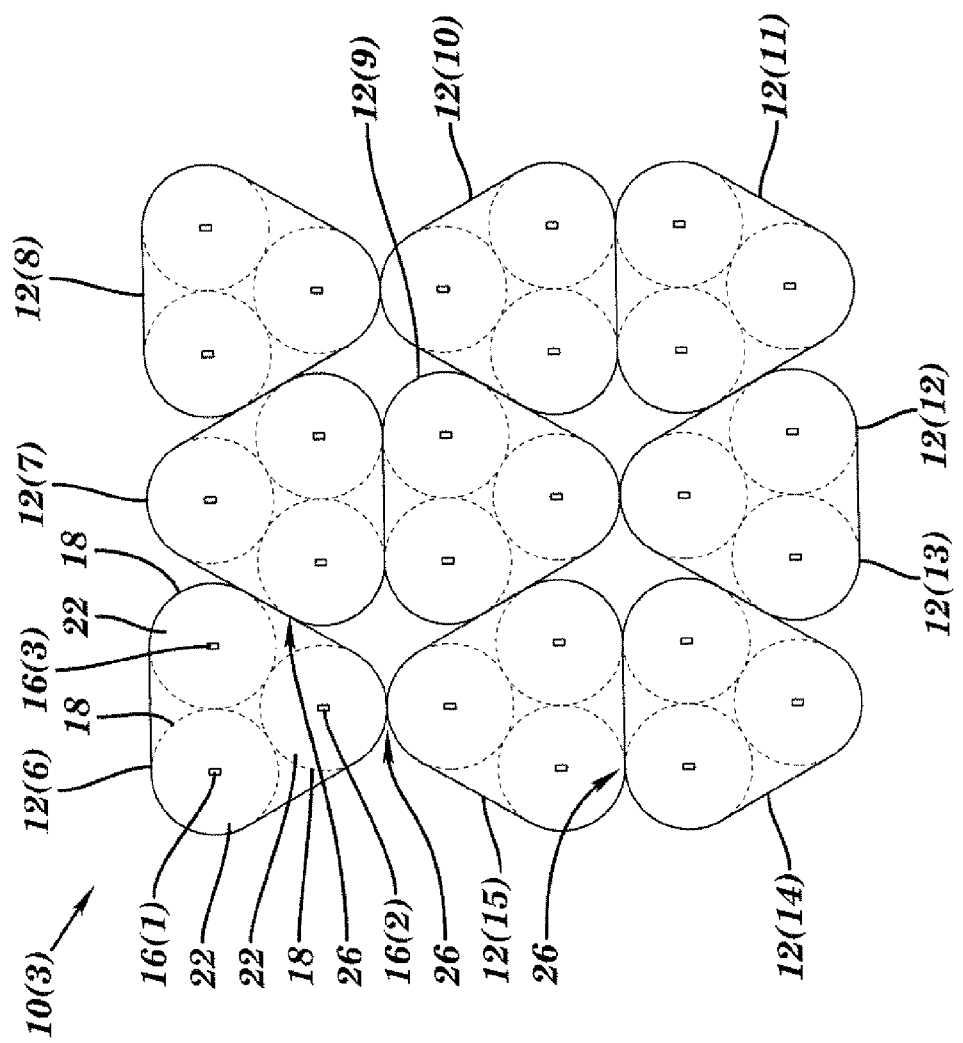
FIG. 6 is a bottom, cross-sectional view of another TIRing condensing array with triple-base condensing elements in accordance with other embodiments of the present invention.

Referring to FIG. 6, a condensing array 10(3) in accordance with other embodiments of the present invention is illustrated. The condensing array 10(3) is the same as condensing array 10(2), except as illustrated and described herein. Elements of condensing array 10(3) which are like elements in condensing array 10(2) will have like reference numerals. In this particular embodiment, the condensing array 10(3) has condensing elements 12(6)-12(15) which each have three first sections 18 with three bases 22 (which for ease of illustration are only referenced with respect to condensing element 12(6) in FIG. 6 and are identical in condensing elements 12(7)-12(15)), although the condensing array 10(3) could have other numbers and types of condensing elements in other configurations. Additionally, as illustrated with condensing element 12(6), each of the condensing elements 12(6)-12(15) has a red LED 16(1), a green LED 16(2), and a blue LED 16(3) which are each attached to a different base 22, although other types and numbers of light sources in other configurations can be used. The condensing elements 12(6)-12(15) in the condensing array 10(3) have multiple attachment areas 26 whose configuration has been described in greater detail earlier and thus will not be described in detail here again.

Figure 7:
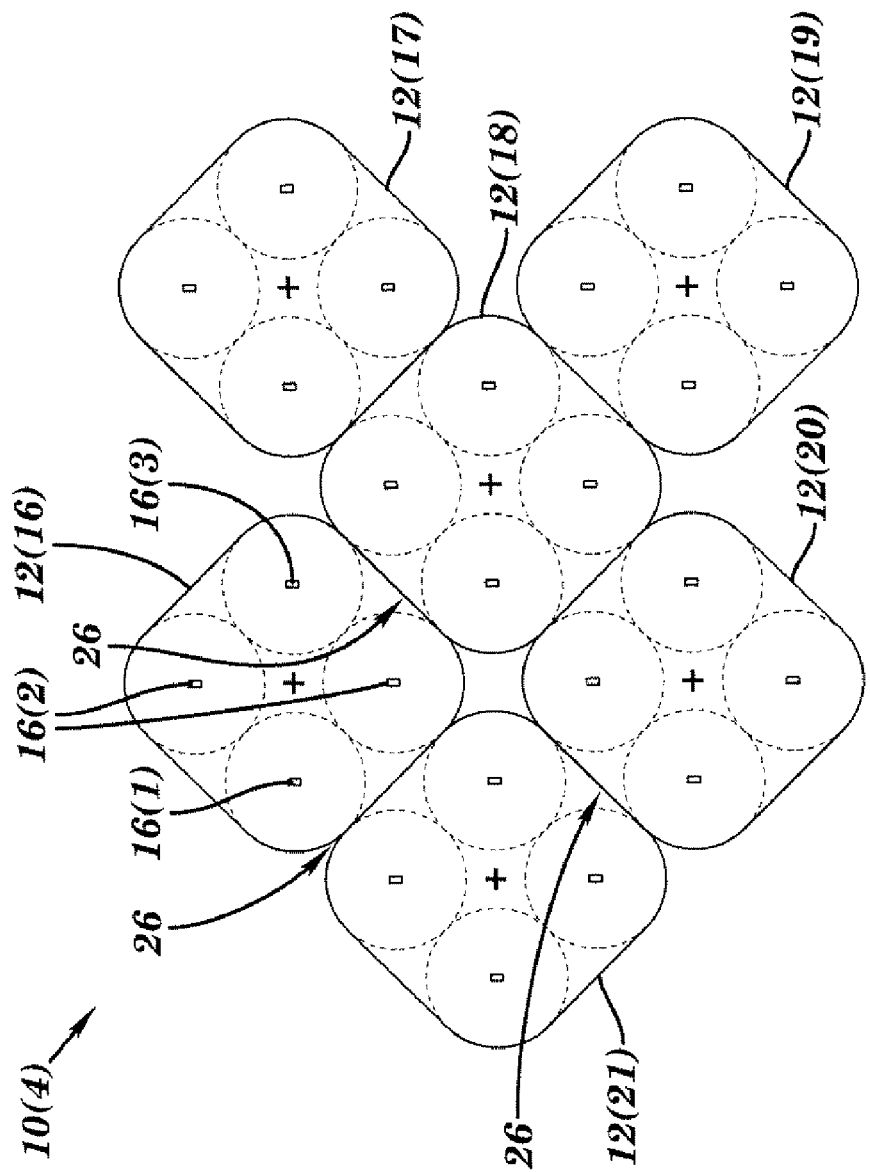
FIG. 7 is a bottom, cross-sectional view of another TIRing condensing array with quadruple-base condensing elements in accordance with other embodiments of the present invention.

Referring to FIG. 7, a condensing array 10(4) in accordance with other embodiments of the present invention is illustrated. The condensing array 10(4) is the same as condensing array 10(2), except as illustrated and described herein. Elements of condensing array 10(4) which are like elements in condensing array 10(2) will have like reference numerals. In this particular embodiment, the condensing array 10(4) has condensing elements 12(16)-12(21) which each have four first sections 18 with four bases 22, although the condensing array 10(4) could have other numbers and types of condensing elements in other configurations. Additionally, as illustrated with condensing element 12(16), each of the condensing elements 12(16)-12(21) has a red LED 16(1), two green LEDs 16(2), and a blue LED 16(3) which are each attached to a different base 22, although other types and numbers of light sources in other configurations can be used. The condensing elements 12(16)-12(21) in the condensing array 10(4) have multiple attachment areas 26 whose configuration has been described in greater detail earlier and thus will not be described in detail here again.

The operation of the condensing array 10(1) will now be described with reference to FIGS. 1-3. By way of example, light from the LED 14 is transmitted into the first section 18(1) of condensing element 12(1) and strikes the sidewall 24(1). The curvature of the sidewall 24(1) provides total internal reflection of this transmitted light which is eventually directed towards the sidewall 28(1) of second section 20(1). The light strikes the sidewall 28(1) of the second section 20(1) and is internally reflected until the angle of incidence of the light from LED 14 is less than the critical angle. At this point, the condensed light is output from the second section.

Similarly, by way of another example light from one or more of the LEDs 16(1)-16(3) is transmitted into the first section 18(2) of condensing element 12(2) and strikes the sidewall 24(2). The curvature of the sidewall 24(2) provides total internal reflection of this transmitted light which is eventually directed towards the sidewall 28(2) of the second section 20(2). The light strikes the sidewall 28(2) of the second section 20(2) and is internally reflected until the angle of incidence of the light from one or more of the LEDs 16(1)-16(3) is less than the critical angle. At this point, the condensed light is output.

By way of yet another example, light from LED 14 may be transmitted from condensing element 12(1) into condensing element 12(2) through attachment area 26(1) and/or light from one or more of the LEDs 16(1)-16(3) may be transmitted from condensing element 12(2) into condensing element 12(1) through attachment area 26(1). More specifically, light from the LED 14, illustrated by Light Ray 1, is transmitted into the first section 18(1) of condensing element 12(1) and then through the attachment area 26(1) into condensing element 12(2) unperturbed. Light Ray 1 is incident on the far side of the right condensing element at greater than the critical angle and thus is internally reflected. Light Ray 1 then acts as described above and exits the second section 20(2) substantially condensed. If the attachment area 26(1) and condensing element 12(2) was not present, then Light Ray 1 would experience mirror symmetry as illustrated by the dashed line in FIG. 2. Similarly, light from one or more of the LEDs 16(1)-16(3) transmitted into the first section 18(2) of condensing element 12(2) and then through the attachment area 26(1) into condensing element 12(1) unperturbed would proceed in a symmetrical manner as described above.

Condensing arrays 10(2)-10(4) operate in the same manner as described above with reference to FIGS. 1 and 2 and thus will not be described in detail here again.

Yet another one of the advantages of the present invention is that each of condensing arrays 10(1)-10(4) improves extraction efficiency of light from LEDs 14 and other light sources as illustrated and described below with reference to FIGS. 8-10.

Figure 8:
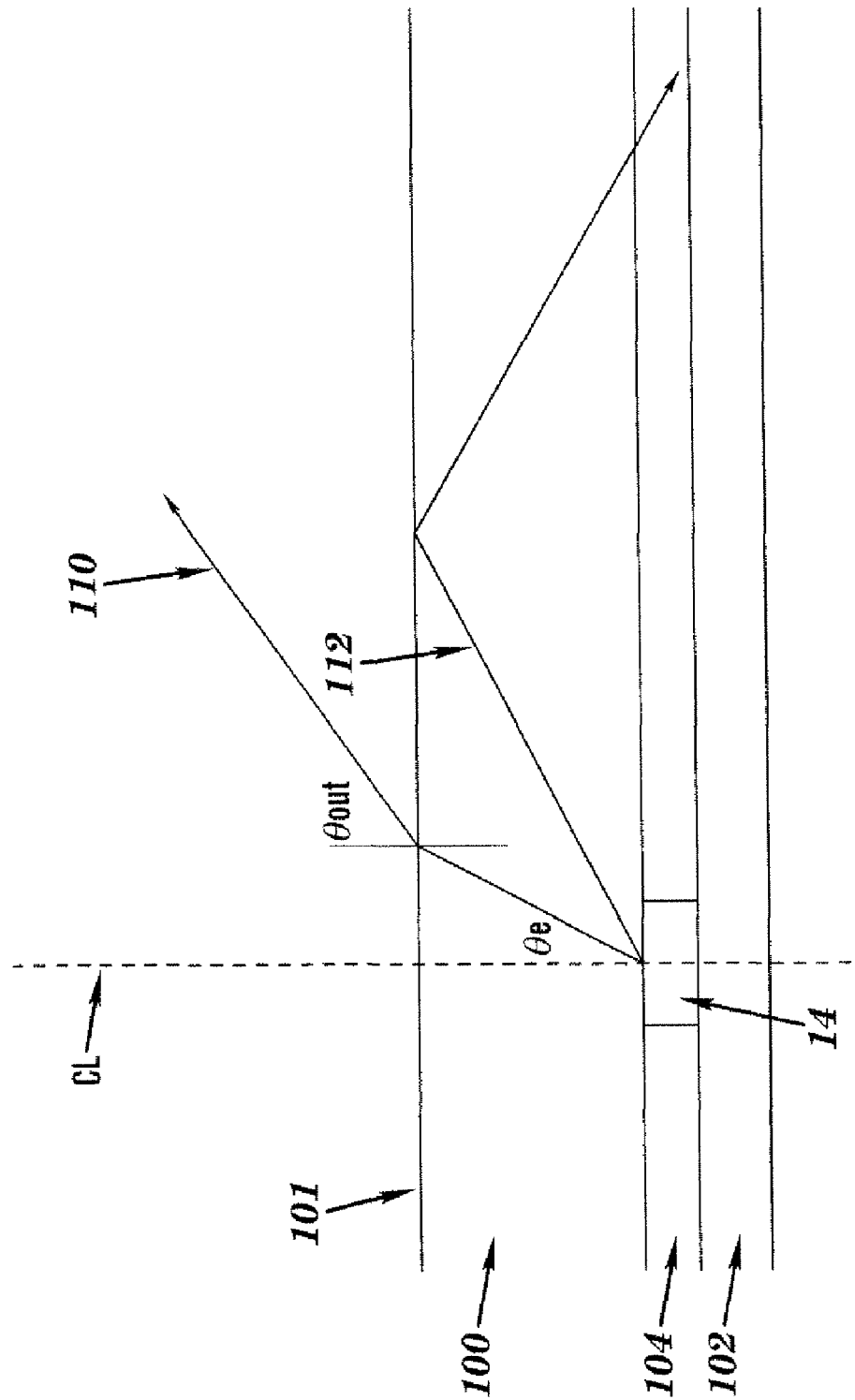
FIG. 8 is a cross-sectional view of a prior art LED die-based light source with two exemplary emitted light rays.

Referring to FIG. 8, a cross-sectional view of a prior art LED die-based light source with two exemplary emitted light paths is illustrated. In this example, the LED 14 is an LED die encapsulated under a substantially transparent layer 100 of polymer material, such as PET, which seals the LED 14 from environmental contaminants yet allows the light rays emitted from the LED 14 to propagate through it. An opposing side of the LED 14 is coupled to an electrical conductor 102 which is used to supply power to the LED 14 and also to conduct heat away from the LED 14 generated during operation. The electrical conductor 102 is generally opaque and substantially non-reflective to light rays. An adhesive 104 is placed alongside the LED 14 to bond the electrical conductor 102, LED 14, and the transparent layer 100 together which are all in optical contact with one another.

In operation, when power is supplied to the LED 14 by the electrical conductor 102, light rays are emitted by the LED 14 into the transparent layer 100. One of these rays is a non-obliquely emitted ray 110 which is emitted into the transparent layer 100 at angle θe with respect to the center-line CL. The emitted ray 110 propagates through the transparent layer 100 and exits into the surrounding medium, such as air, at angle θout in accordance with Snell's Law. Another ray, ray 112 is obliquely emitted into the transparent layer 100 at an oblique angle. When the emitted ray 112 reaches surface 101 of the transparent layer 100, TIR occurs and the ray 112 is reflected back on the substantially non-reflective conductor 102 where it is substantially absorbed. Accordingly, a portion of the rays which are emitted obliquely by the LED 14 are lost.

Figure 9:
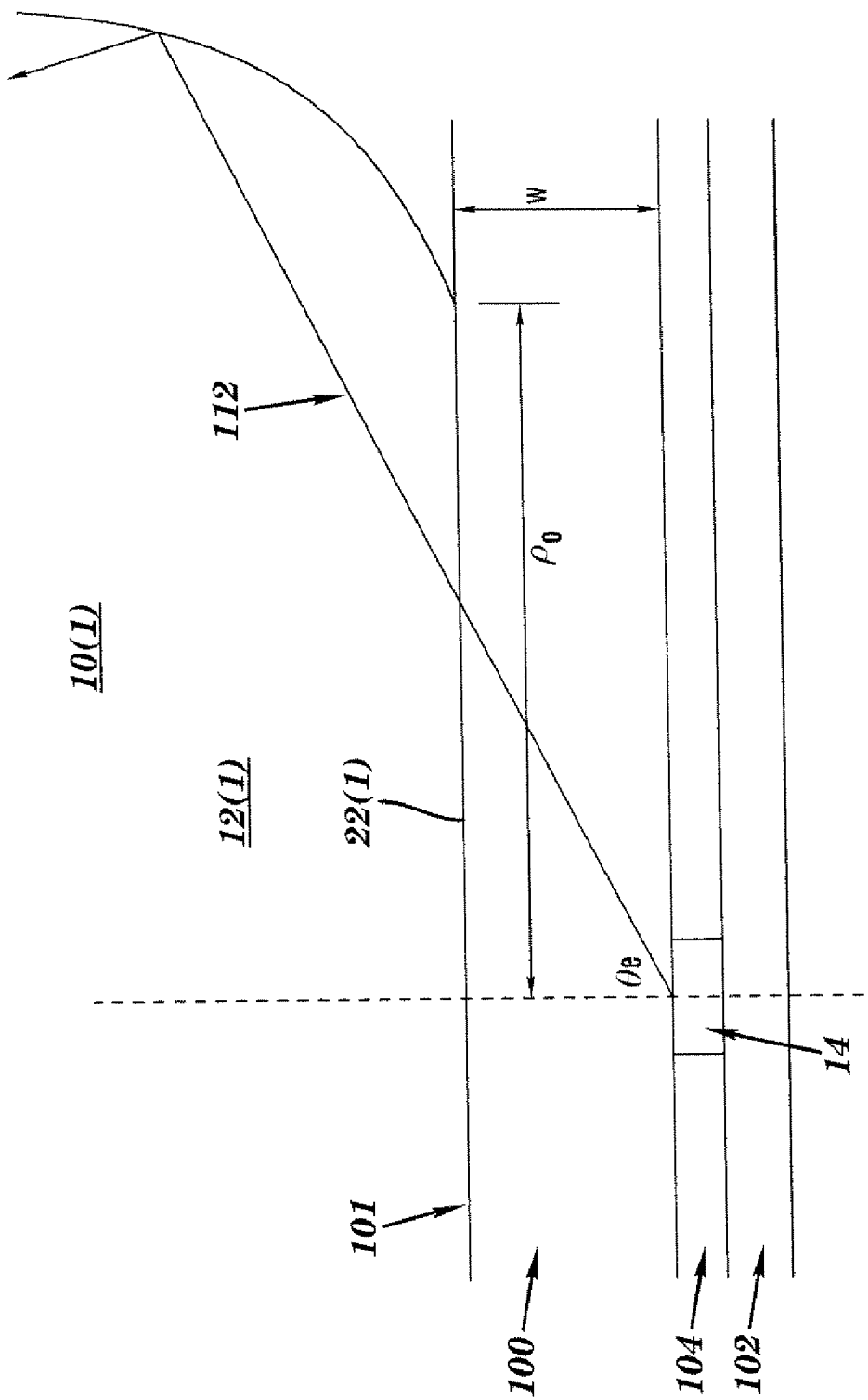
FIG. 9 is a partial, cross-sectional view of a TIRing condensing element in accordance with exemplary embodiments of the present invention coupled to an LED die-based light source along with an exemplary emitted light ray.

Referring to FIG. 9, a partial, cross-sectional view of a TIRing condensing array 10(1) in accordance with exemplary embodiments of the present invention coupled to an LED die-based light source along with an exemplary emitted light ray is illustrated, although other type of TIRing condensing arrays could be used, such as one or more of TiRing condensing arrays 10(2)-10(4). In these embodiments, the LED 14 also is encapsulated under a substantially transparent layer 100 of polymer material, such as PET, which seals the LED 14 from environmental contaminants yet allows the light rays emitted from the LED 14 to propagate through it, although other types and numbers of materials with other properties can be used. An opposing side of the LED 14 is again coupled to an electrical conductor 102 which is used to supply power to the LED 14 and also to conduct heat away from the LED 14 generated during operation, although other manners for coupling power to the LED 14 and for dissipating heat can be used. The electrical conductor 102 is generally opaque and substantially non-reflective to light, although other types of conductors with other properties can be used. An adhesive 104 is placed alongside the LED 14 to bond the electrical conductor 102, LED 14, and the transparent layer 100 together which are all in optical contact with one another, although other manners for optically coupling these elements together can be used. A base 22(1) of one of the condensing elements 12(1) of a TIRing condensing array 10(1), as previously illustrated and described herein, is installed on and is in optical contact with surface 101 of the transparent layer 100, although other numbers and types of the condensing elements could be installed, such as one or more of condensing elements 12(2)-12(21).

In operation, when the same ray 112 described earlier with reference to FIG. 10 is emitted by the LED 14 into the transparent layer 100 at an oblique angle, there is no TIR of the ray 112 at the surface 101 of the transparent layer 100 below the condensing element 12(1). Instead, the ray 112 simply transmits through the surface 101 and into the TIRing condensing element 12(1). Once the ray 112 is in the TIRing condensing element 12(1), the ray 112 propagates in the manner previously illustrated and described herein. Accordingly, with the addition of the base 22(1) of TIRing condensing element 12(1) on the surface 101 of the transparent layer 100, more of the light rays emitted by the LED 14 are collected by the TIRing condensing element 12(1) improving the overall extraction efficiency of the optical system. In these embodiments, extraction efficiency equals the total light passing through a transparent layer divided by the total light entering the transparent layer.

By way of example only, a numerical example to illustrate a typical efficiency improvement with the base 22(1) of the TIRing condensing element 12(1) on the surface 101 of the transparent layer 100 will now be described. If the refractive index of the transparent layer 100 is 1.556, then its critical angle is 40.0°. To facilitate the calculations, a table of emissions, in percent, as a function of θe, in degrees, is presented in FIG. 10. The emissions are assumed to be Lambertian in nature, which follow a cosine-law drop-off with angle θe, and the amount of light emitted into angles above θe in accordance with the cosine-law is presented in the "Source Emission Beyond θe" column. The light collection is also a function of solid-angle, whose calculations are presented in the "Solid Angle . . . " and "Hemisphere . . . " columns. The rightmost column, "% of Light Emitted Beyond θe" is the multiplication of the cosine-law column and "% of Hemisphere Beyond θe" column, and is the column of interest in computing collection efficiencies of the TIRing condensing element 10.

Again, assuming in this particular example, the critical angle is 40.0°, then from the rightmost column of this table 27.36% of the light emitted by the LED 14 lies outside the 40° critical angle and will be TIR'ed. Accordingly, at this critical angle 72.64% of the light will not be TIR'ed.

Next, if the base 22(1) of the condensing element 12(1) is now on the surface 101 of the transparent layer 100 and in this particular example the radius of the base 22(1), $\rho_0$, is 1.0 mm and the width w of the transparent layer 100 is 0.1 mm, the collection angle of the emitted light θe is then $\tan^{-1}(1/0.1)=84.3°$. From the rightmost column of this table, at 84°, only 0.06% of the light emitted from the LED 14 will miss the base 22(1) and TIR at the surface 101 of the transparent layer 100. In other words, 99.94% of the light emitted by the LED 14 into transparent layer 100 will be collected by the TIRing condensing element 12(1), which is a substantial improvement in efficiency.

Accordingly, the condensed array produces a substantially condensed light output from the condensing elements which are interconnected without compromising condensing performance. Additionally, the condensing array as described herein is easy and inexpensive to produce with conventional manufacturing procedures, such as injection molding. Further, the resulting condensing array has a compact design which is easy to use. Even further, the TIRing condensing arrays substantially increase the extraction efficiency from light sources.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A condensing array comprising:
a plurality of condensing elements;
at least one light source positioned proximate to the condensing elements to transmit light into a first section of at least one of the condensing elements which are arranged with respect to the at least one light source to angularly condense the light;
at least one of the condensing elements having a first section that provides substantially total internal reflection of light entering at a base of the first section and a second section which tapers from the first section towards an optical axis extending through the first and second sections, the first and second sections are configured so a half-power angle of the light output from the second section is less than the half-power angle of the light entering the first section;

at least one of the condensing elements is optically and mechanically connected to at least one other of the condensing elements at an attachment area between the condensing elements.

2. The array as set forth in claim 1 wherein the attachment area is at least partially located in the first sections of the optically and mechanically connected condensing elements.

3. The array as set forth in claim 1 wherein the first section has at least one sidewall with a curvature to provide the substantially total internal reflection of light entering at the base of the first section.

4. The array as set forth in claim 1 wherein the second section has at least one sidewall which is substantially linear in cross-section and provides internal reflection and refraction of the light from the first section.

5. The array as set forth in claim 4 wherein the at least one sidewall of the second section tapers to an end point at the optical axis of the condensing element.

6. The array as set forth in claim 1 wherein the second section has at least one sidewall which is at least one of non-linear in cross-section, textured, and made from a light diffusing material.

7. The array as set forth in claim 1 wherein the half-power angle of the light output from the second section is less than or equal to about twenty degrees about the optical axis.

8. The array as set forth in claim 7 wherein the half-power angle of the light entering the first section is greater than or equal to forty degrees about the optical axis.

9. The array as set forth in claim 1 wherein a base of the first section for at least one of the condensing elements is substantially plano.

10. The array as set forth in claim 1 further comprising at least one transparent layer between the at least one light source and at least one of the condensing elements, wherein the at least one of the condensing elements increases an extraction efficiency of the transmitted light passing through the at least one transparent layer from the at least one light source.

11. The array as set forth in claim 10 wherein the light source is at least one light emitting diode.

12. The array as set forth in claim 10 further comprising a plurality of light sources positioned to transmit light into the first section of at least one of the condensing elements.

13. The array as set forth in claim 12 wherein the plurality of light sources comprise a red light source, a green light source, and a blue light source.

14. The array as set forth in claim 1 wherein the plurality of condensing elements are arranged in a two dimensional array.

15. The array as set forth in claim 1 further comprising wherein the first section and the second section of the at least one of the condensing elements are integrally formed together.

16. The array as set forth in claim 1 wherein the first section has two or more bases which merge into the second section of at least one of the condensing elements.

17. The array as set forth in claim 16 further comprising a plurality of light sources, each of the bases in the first section of at least one of the condensing elements having at least one of the light source positioned to transmit the light into the first section.

18. The array as set forth in claim 17 wherein the plurality of light sources comprise a red light source, a green light source, and a blue light source.

19. The array as set forth in claim 1 wherein at least one of the condensing elements is optically and mechanically connected to at least two other of the condensing elements at attachment areas between the condensing elements.

20. A method for making a condensing array, the method comprising:

forming a plurality of condensing elements, at least one of the condensing elements having a first section that provides substantially total internal reflection of light from a light source proximate to and entering at a base of the first section and a second section which tapers from the first section towards an optical axis extending through the first and second sections, the first and second sections are configured and positioned with respect to the light source so a half-power angle of the light output from the second section is less than the half-power angle of the light entering the first section to angularly condense the light; and optically and mechanically coupling the at least one of the condensing elements to at least one other of the condensing elements at an attachment area between the condensing elements.

21. The method as set forth in claim 20 wherein the attachment area is located in the first sections of the optically and mechanically connected condensing elements.

22. The method as set forth in claim 20 further comprising forming the first section of the at least one of the condensing elements to have at least one sidewall with a curvature to provide the substantially total internal reflection of light entering at the base of the first section.

23. The method as set forth in claim 20 further comprising forming the second section of the at least one of the condensing elements to have at least one sidewall which is substantially linear in cross-section and provides internal reflection and refraction of the light from the first section.

24. The method as set forth in claim 23 wherein the forming the second section further comprises forming the at least one sidewall of the second section tapers to an end point at the optical axis of the condensing element.

25. The method as set forth in claim 20 wherein the forming the second section further comprises forming the at least one sidewall of the second section to be at least one of non-linear in cross-section, textured, and made from a light diffusing material.

26. The method as set forth in claim 20 wherein the half-power angle of the light output from the second section is less than or equal to about twenty degrees about the optical axis.

27. The method as set forth in claim 26 wherein the half-power angle of the light entering the first section is greater than or equal to forty degrees about the optical axis.

28. The method as set forth in claim 20 wherein a base of the first section for at least one of the condensing elements is substantially plano.

29. The method as set forth in claim 20 further comprising providing at least one transparent layer between the at least one light source and at least one of the condensing elements, wherein the at least one of the condensing elements increases an extraction efficiency of the transmitted light passing through the at least one transparent layer from the at least one light source.

30. The method as set forth in claim 20 wherein the light source is at least one light emitting diode.

31. The method as set forth in claim 20 further comprising positioning a plurality of light sources to transmit light into the first section of at least one of the condensing elements.

32. The method as set forth in claim 31 wherein the plurality of light sources comprise a red light source, a green light source, and a blue light source.

33. The method as set forth in claim 20 wherein the forming a plurality of condensing elements further comprises forming the plurality of condensing elements in a two dimensional array.

34. The method as set forth in claim 20 further comprising integrally forming the first section and the second section of the at least one of the condensing elements together.

35. The method as set forth in claim 20 wherein the first section has two or more bases which merge into the second section of at least one of the condensing elements.

36. The method as set forth in claim 35 further comprising a plurality of light sources, each of the bases in the first section of at least one of the condensing elements having at least one of the light source positioned to transmit the light into the first section.

37. The method as set forth in claim 36 wherein the plurality of light sources comprise a red light source, a green light source, and a blue light source.

38. The method as set forth in claim 20 wherein at least one of the condensing elements is optically and mechanically connected to at least two other of the condensing elements at attachment areas between the condensing elements.

* * * * *